United States Patent [19]
Schmoling

[11] Patent Number: 5,810,546
[45] Date of Patent: Sep. 22, 1998

[54] APPARATUS FOR TRANSPORTING AND LOADING WATERCRAFT ONTO A PICK-UP TRUCK

[76] Inventor: Ralph B. Schmoling, 7268 Fred Moore Hwy., St. Clair, Mich. 48079

[21] Appl. No.: 824,818

[22] Filed: Mar. 26, 1997

[51] Int. Cl.⁶ ........................................................ B60P 1/43
[52] U.S. Cl. ........................ 414/538; 114/344; 280/414.1; 414/343
[58] Field of Search ............................... 414/537, 538, 414/522, 462, 506, 559, 343, 345, 477, 478, 480; 280/414.1; 114/344

[56] References Cited

U.S. PATENT DOCUMENTS

| | | | |
|---|---|---|---|
| D. 355,518 | 2/1995 | Belanger | D34/32 |
| 2,576,355 | 11/1951 | Parmesam | 414/538 |
| 3,812,988 | 5/1974 | Pyle | 414/477 |
| 3,927,779 | 12/1975 | Johnson | 414/462 |
| 4,081,095 | 3/1978 | Wilburn et al. | 414/522 X |
| 4,212,580 | 7/1980 | Fluck | 414/538 X |
| 4,685,857 | 8/1987 | Goeser et al. | 414/537 X |
| 4,900,217 | 2/1990 | Nelson | 414/537 |
| 4,960,356 | 10/1990 | Wrenn | 414/537 |
| 4,990,049 | 2/1991 | Hargrove | 414/537 |
| 5,064,335 | 11/1991 | Bergeron et al. | 414/522 |
| 5,133,584 | 7/1992 | McCleary | 296/61 |
| 5,154,564 | 10/1992 | Koch | 414/506 |
| 5,244,335 | 9/1993 | Johns | 414/537 |
| 5,249,545 | 10/1993 | Gettman | 280/414.1 X |
| 5,332,249 | 7/1994 | Solberg et al. | 280/414.1 |
| 5,468,114 | 11/1995 | Hickerson | 41/537 |
| 5,536,058 | 7/1996 | Otis | 414/537 X |
| 5,542,810 | 8/1996 | Florus | 414/538 |
| 5,553,762 | 9/1996 | Brown | 414/537 X |
| 5,603,600 | 2/1997 | Egar et al. | 414/538 X |

*Primary Examiner*—David A. Bucci
*Attorney, Agent, or Firm*—Harness, Dickey & Pierce, PLC

[57] ABSTRACT

Apparatus for loading and unloading a personal watercraft from a bed of a pickup truck. The apparatus includes an outer rail assembly and an inner rail assembly adapted to telescopically slide into and out of the outer rail assembly. The outer rail assembly is of dimensions permitting it to lay flat on a bed of a pickup truck and to be releasably secured in the bed. Loading and unloading of the watercraft is accomplished by pulling the inner rail assembly slidably out from the outer rail assembly and resting one end of the inner rail assembly in shallow water. A pulley assembly is used by an individual to controllably lower the watercraft into the water or draw the watercraft up out of the water along the inner and outer rail assemblies. Once loading or unloading has taken place, the inner rail assembly is slidably inserted into the outer rail assembly. A dolly is disclosed for enabling the watercraft to be unloaded for storage off of the bed of a pickup struck by a single individual. The apparatus is lightweight, relatively inexpensive to construct, and enables a single person to easily and conveniently load and unload a personal watercraft without assistance from other individuals and without external ramps or tools. The apparatus also obviates the need for a trailer, but can readily be used with a conventional trailer having a flat bed if a pickup truck is not available. Minor modifications to the apparatus could allow the apparatus to be used to transport other recreational vehicles such as snowmobiles.

20 Claims, 4 Drawing Sheets

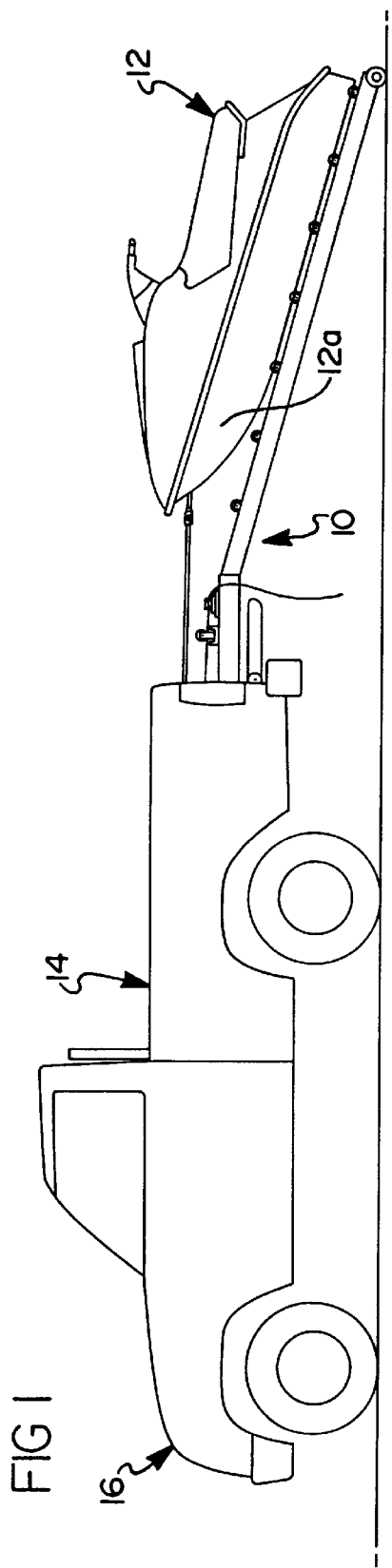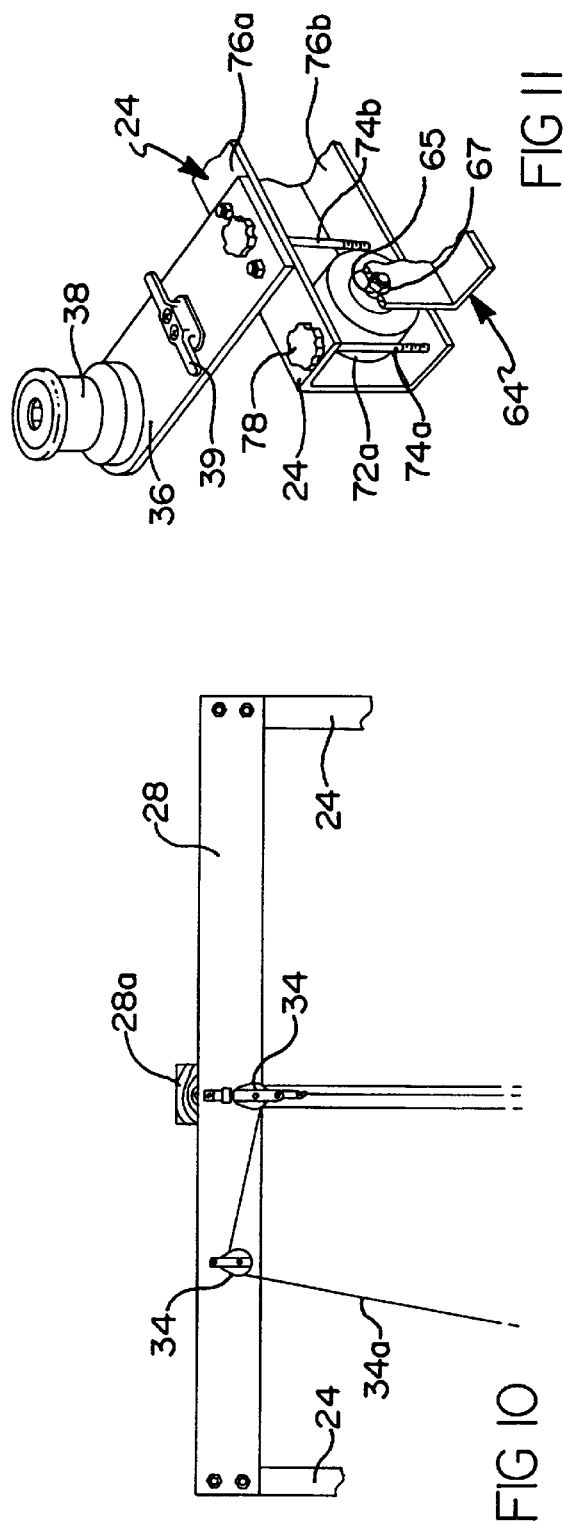

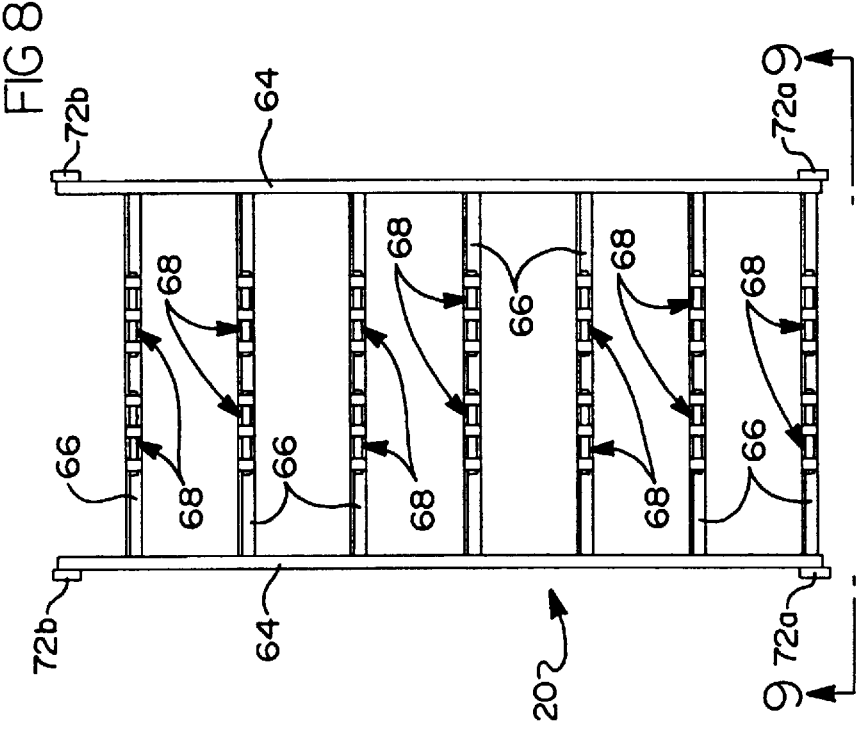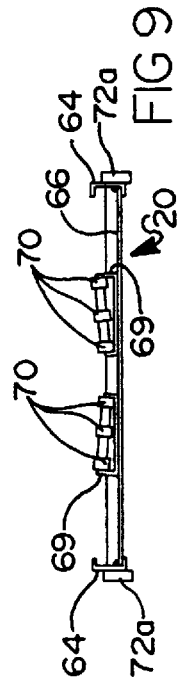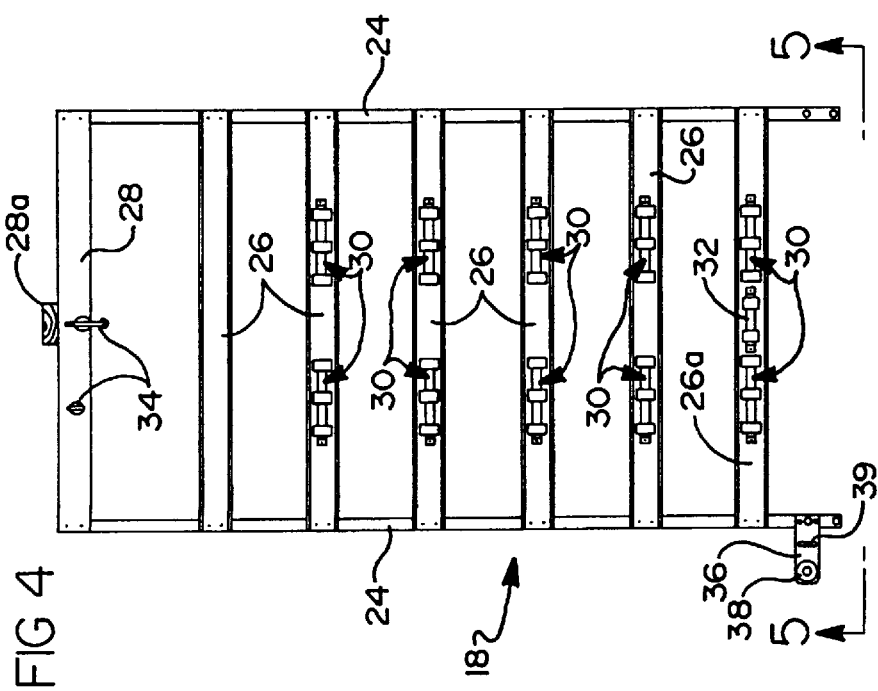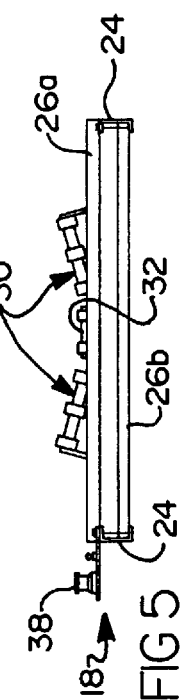

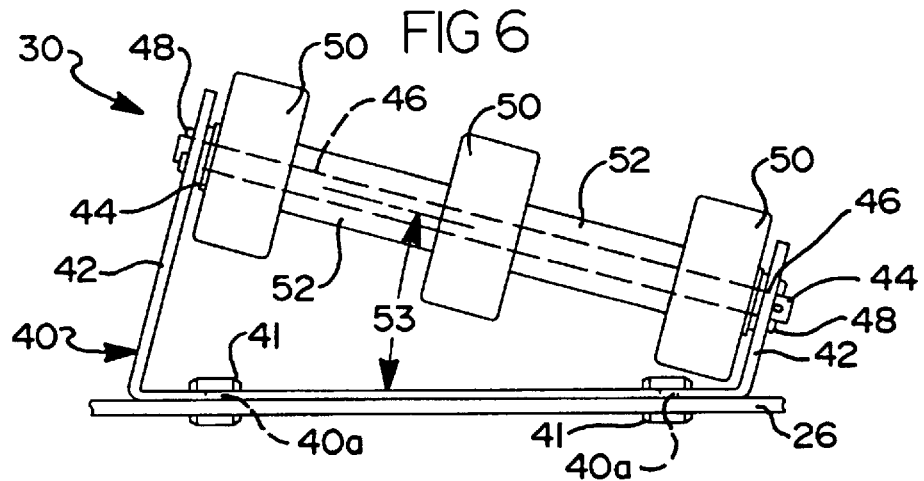
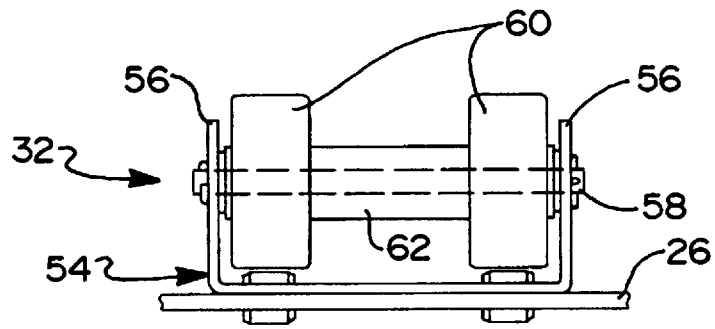
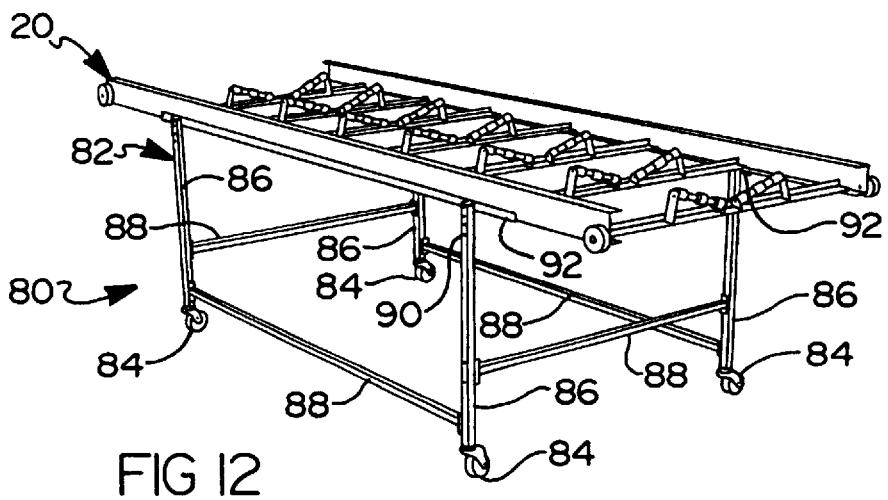

APPARATUS FOR TRANSPORTING AND LOADING WATERCRAFT ONTO A PICK-UP TRUCK

BACKGROUND OF THE INVENTION

1. Technical Field

This invention relates to an apparatus for loading, unloading and transporting personal watercraft within a bed of a vehicle such as a pickup truck, and more particularly to an apparatus for allowing an individual to quickly and easily load and unload a personal watercraft from a bed of a pickup truck without the help of one or more persons and without external tools or equipment, to enable the watercraft to be securely transported within the bed of the pickup truck.

2. Discussion

Personal watercraft have grown greatly in popularity in recent years. Such watercraft have up until now been transported primarily on a trailer which is towed behind the vehicle. The trailer typically has some means for allowing the watercraft to be rolled therefrom into water. Certain apparatus have also been developed for permitting personal watercraft to be transported, loaded and unloaded from the back of a vehicle such as a pickup truck. Examples of such apparatus are disclosed in U.S. Pat. Nos. 4,960,356 and 5,542,810.

When the personal watercraft is towed on a trailer, the obvious disadvantage is the need for a trailer hitch on the vehicle, as well as the added expense of the trailer itself. Whether the watercraft is transported on a trailer or in the bed of a vehicle such as a pickup truck, a major disadvantage is the requirement of several individuals for loading and unloading the watercraft onto the trailer or pickup truck bed. Although personal watercraft are significantly smaller and lighter than other forms of watercraft, such watercraft still typically weigh on the order of 300–800 lbs. and are extremely difficult, if not impossible in most instances, for one individual to easily load and unload by himself or herself.

SUMMARY OF THE INVENTION

It is therefore a principal object of the present invention to provide an apparatus which enables one individual to easily and conveniently load and unload a personal watercraft from a bed of a pickup truck, as well as to enable the watercraft to be securely transported within the bed of the pickup truck.

It is further an additional object of the present invention to provide an apparatus which is relatively lightweight and removably mounted within a bed of a pickup truck, and which enables one individual to easily load and unload the personal watercraft therefrom without various tools, external ramps, etc.

It is yet another object of the present invention to provide an apparatus for loading and unloading a personal watercraft onto a bed of a pickup truck, where the apparatus is relatively inexpensive in construction, relatively lightweight, readily removable from the bed of the pickup truck, and which does not require any external ramps, tools, cable assemblies, etc., for the watercraft to be unloaded by a single individual into water, and loaded back onto the bed of the pickup truck by the individual in a convenient and easy manner without the assistance of other individuals.

It is still another object of the present invention to provide an apparatus which is removably mountable on a trailer bed and which enables a personal watercraft to be quickly and easily loaded from and onto the trailer bed by a single individual without external ramps or cable assemblies.

The above and other objects are accomplished by a loading and unloading apparatus in accordance with preferred embodiments of the present invention. The apparatus of the present invention generally includes an outer rail assembly and an inner rail assembly which may be telescopically slid into and removed from the outer rail assembly. The outer rail assembly includes a pair of outer side rails which are separated by a plurality of spaced apart cross rails extending therebetween. Each one of the cross rails has a plurality of roller assemblies mounted thereon for supporting a hull of the watercraft once the watercraft is urged onto the outer rail assembly during loading.

The inner rail assembly includes a pair of outer side rails and a plurality of spaced apart cross rails. Each of the cross rails includes a plurality of roller assemblies for permitting the watercraft to be slid therealong during loading and unloading operations. The inner rail assembly is further of dimensions which permit it to be telescopically slid into the outer rail assembly and removed therefrom quickly and easily by a single individual. To facilitate this action the inner rail assembly includes a plurality of guide rollers disposed along outer surfaces of the outer side rails thereof. The guide rollers are adapted to roll within the outer side rails of the outer rail assembly. Thus, removal of the inner rail assembly from the outer rail assembly is accomplished by one individual simply grasping an endmost side rail of the inner rail assembly and pulling outwardly thereon as the individual walks away from the back end of the pickup truck until the inner rail assembly has been completely extended from the outer rail assembly. At this point the individual simply lowers the end of the inner rail assembly being grasped into the edge in which the watercraft is to be launched or withdrawn from.

To assist in the loading and unloading of the watercraft a pulley assembly is provided which includes rope or cabling which may be removably secured to the hull of the watercraft. The pulley assembly forms a winch which allows a single individual to easily draw the watercraft up the inner rail assembly and onto the outer rail assembly thereof during loading and to quickly and easily unload the watercraft from the apparatus into the water.

The apparatus of the present invention is relatively light in weight and is of dimensions permitting it to lay flat in the bed of a pickup truck and to be releasably secured within the bed by one or more securing members such as nylon straps secured to various anchoring points within the pickup truck bed. Thus, the apparatus can be quickly removed by a single individual when not needed. It will be appreciated, however, that the apparatus of the present invention could just as easily be secured to a bed of a conventional trailer which is otherwise not suited for transporting personal watercraft.

BRIEF DESCRIPTION OF THE DRAWINGS

The various advantages of the present invention will become apparent to one skilled in the art by reading the following specification and subjoined claims and by referencing the following drawings in which:

FIG. 1 is an environmental view of the apparatus in the process of being used to unload a personal watercraft into water from the bed of a pickup truck;

FIG. 4 is a plan view of the outer rail assembly;

FIG. 5 is an end view of the outer rail assembly shown in FIG. 4 in accordance with directional line 5—5 in FIG. 4;

FIG. 6 is a side view of one of the roller assemblies used to support the hull of a watercraft;

FIG. 7 is a side view of the intermediate roller assembly;

FIG. 8 is a plan view of the inner rail assembly;

FIG. 9 is an end view of the inner rail assembly of FIG. 8 in accordance with directional line 9—9 in FIG. 8;

FIG. 10 is a plan view of a portion of the outer rail assembly illustrating a portion of the pulley assembly which is used for loading and unloading the watercraft from the apparatus;

FIG. 11 is a plan view of a portion of the outer rail assembly showing the spool around which the ropes of the pulley assembly are wrapped once the watercraft is loaded onto the apparatus, and one of the guide rollers of the inner assembly illustrating the two stop members that are used to limit extending movement of the inner rail assembly and to lock the inner rail assembly within the outer rail assembly; and FIG. 12 is a perspective view of a dolly used for loading and unloading the watercraft from the bed of the pickup truck by an individual.

DETAILED DESCRIPTION OF THE PREFERRED EMBODIMENTS

Figures 2, 3:
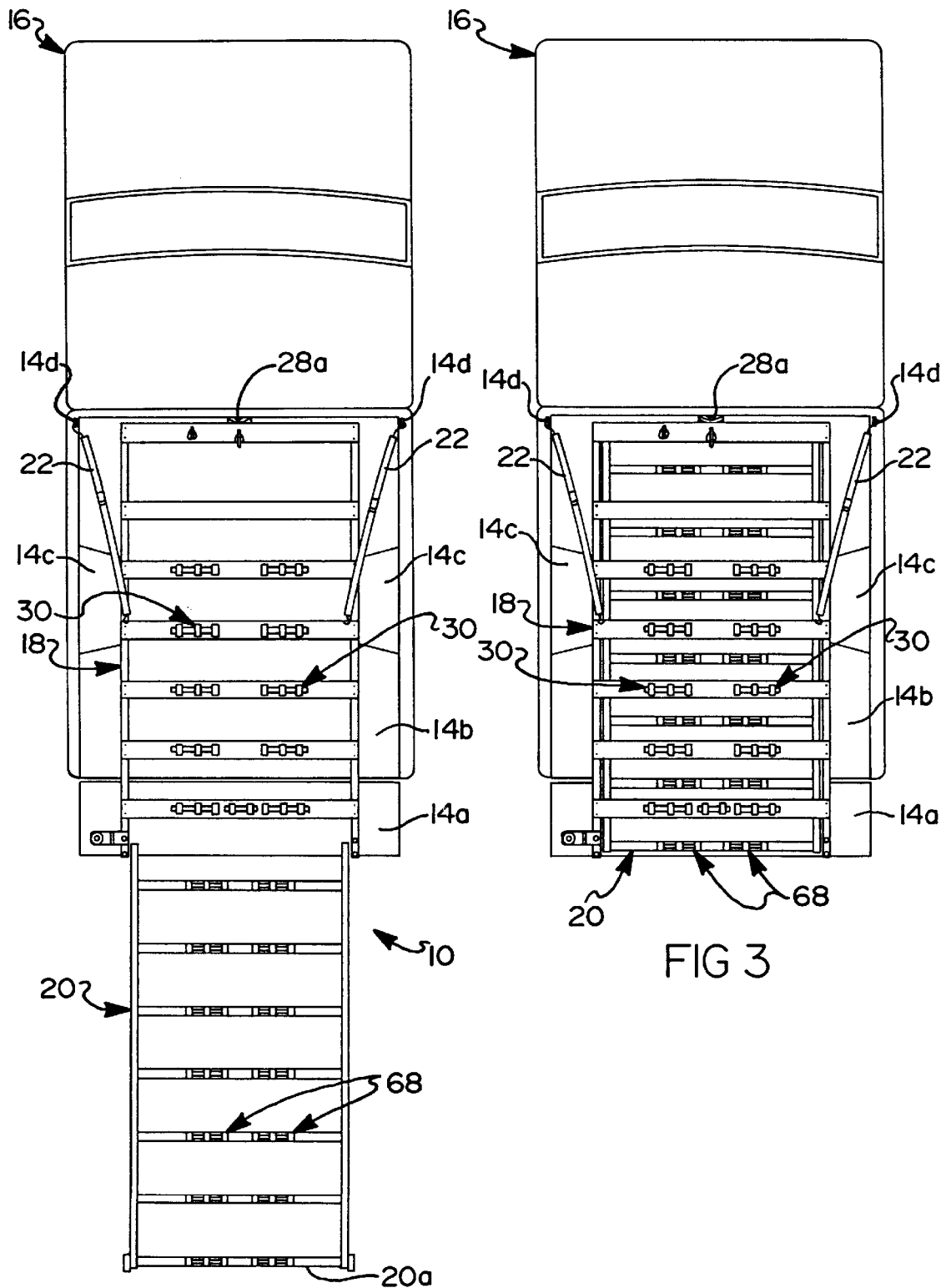
FIG. 2 is a plan view of the pickup truck shown in FIG. 1 illustrating the inner rail assembly extended the maximum amount from the outer side rail assembly.
FIG. 3 is a plan view of the apparatus of FIG. 2 illustrating the apparatus when the inner side rail assembly is completely inserted into the outer side rail assembly.

Referring to FIG. 1, there is shown an apparatus 10 for loading, unloading and transporting personal watercraft 12 within a bed 14 of a vehicle such as a pickup truck 16. It is a principal advantage of the present invention that the apparatus 10 enables one individual to easily and conveniently load a personal watercraft onto a bed of a pickup truck, unload the watercraft therefrom, and transport the watercraft securely within the bed. Importantly, the apparatus 10 allows loading and unloading of the watercraft 12 from the bed of the pickup truck without the need for external ramps, cable assemblies, etc. Thus, a single individual, man or woman, is able to easily load and unload a watercraft.

Referring to FIGS. 2 and 3, the apparatus 10 comprises an outer rail assembly 18 and an inner rail assembly 20. With specific reference to FIG. 2, the inner rail assembly 20 is telescopically insertable into and extendable from the outer rail assembly 18 by an individual grasping an outermost end portion 20a of the inner rail assembly 20 and pulling the assembly 20 outwardly away from the pickup truck 16 as the individual walks away from the pickup truck 16. Since the various components of each of the inner 20 and outer 18 rail assemblies are manufactured preferably from aluminum, the inner rail assembly 20 is very light—even when fully extended from the outer rail assembly 18 as shown in FIG. 2. In this position, the outermost end portion 20a of the inner rail assembly 20 only requires about 30 lbs. of force to lift, and can therefore be easily lifted and lowered when the inner rail assembly 20 is fully extended by a man or a woman.

With specific reference to FIG. 3, when in the "stowed" or retracted position the apparatus 10 forms a relatively compact assembly which does not protrude outwardly of the lowered tailgate 14a of the pickup truck 16. From FIG. 3 it will also be noted that the outer dimensions of the outer rail assembly 18 are such that the apparatus 10 is able to lie flat on the floor 14b of the bed 14 inbetween the wheel wells 14c of the bed 14. The apparatus 10 is anchored within the bed 14 by a plurality of members such as nylon straps 22 which are secured to suitably strong anchoring points 14d of the bed 14. In this regard it will be noted that the beds of pickup trucks invariably include one or more anchoring points such as fold down anchoring members which are rigidly attached to either the floor 14b or other portions of the bed 14. These anchoring points or members are typically conveniently located by various vehicle manufacturers for the purpose of securing items within the bed of the vehicle by nylon straps, bungee cords or ropes. Accordingly, in most instances it will not be necessary to modify the bed 14 in any way to include members to which the nylon straps 22 can be secured.

It should also be noted that while FIGS. 2 and 3 depict the apparatus 10 laying on the bed 14b with the tailgate 14a of the bed in its open position, that the apparatus 10 could be constructed to be of a length which enables it to fit within the bed 14 while the tailgate 14a is in its up (i.e., closed) position provided the overall length of the apparatus 10 is still sufficient to securely support the watercraft 12. In FIGS. 2 and 3 the apparatus 10 has been depicted as having a length sufficient to support a personal watercraft adapted for holding two riders, and which therefore requires the apparatus 10 to have a slightly longer overall length which necessitates the tailgate 14a being maintained in its lower or open position.

Referring now to FIGS. 4 and 5, the outer rail assembly 18 includes a pair of U-shaped outer side rails 24, a plurality of U-shaped cross rails 26, a U-shaped end rail 28 and a supplemental cross rail 26b. The cross rails 26 and end rail 28 are fixedly secured such as by threaded bolts and nuts (not shown) extending through drilled or machined holes in the side rails 24 at spaced apart locations along the length of each side rail 24. Once assembled, the outer rail assembly 18 forms a rigid assembly which is highly resistant to bending and flexing.

With specific reference to FIG. 4, several of the cross rails 26 include mounted thereon a pair of roller assemblies 30. On one endmost cross rail 26a an additional intermediate roller assembly 32 is disposed between the roller assemblies 30. The roller assemblies 30 on each cross rail 26 are positioned to form a V-shape to support the hull 12a of the watercraft 12 thereon and to enable the hull 12a to be rolled up onto and off of the outer rail assembly 18.

With reference to FIGS. 4 and 10, end rail 28 includes a plurality of pulleys 34 around which a nylon rope 34a or other like member is entrained for acting as a winch to enable an individual to draw the watercraft 12 up onto the apparatus 10 and to unload the watercraft 12 conveniently and easily. End rail 28 also includes an upright stop member 28a, which is illustrated as a 2"×4"section of wood, which extends vertically to limit forward movement of the watercraft 12 onto the outer rail assembly 18 when loading the watercraft 12 thereon. This prevents an individual from accidentally drawing the watercraft too far forward and causing the watercraft 12 to strike the rear window of the pickup truck 16. It will be appreciated, however, that a variety of other means could be included to stop rolling movement of the watercraft 12 along the outer roller assembly 18 at a predetermined point. One such means could be a rubber block of material mounted near one of the cross rails 26 which engages the hull 12a to stop forward loading movement of the watercraft 12 well before the watercraft would strike the rear window.

Referring to FIGS. 4, 10 and 11, one of the outer side rails 24 includes a member 36 which is secured by threaded nuts and bolts thereto so as to protrude perpendicularly from the side rail 24. The member 36 includes a spool 38 around which the nylon rope entrained around the pulleys 34 can be drawn to assist in loading and unloading operations. A cleat 39 enables the nylon rope 34a to be quickly and securely tied off once the watercraft 12 has been drawn completely up onto the outer rail assembly 24.

Referring now to FIG. 6, one of the roller assemblies 30 is shown in greater detail. The roller assembly 30 includes a U-shaped bracket member 40 which is securely affixed to an associated one of the cross rails 26 (FIG. 4) by threaded nuts and bolts 41 extending through openings 40a. The bracket member 40 includes a pair of upwardly protruding arms 42 which are bent so as to be angled slightly (i.e., so as to be not perpendicular to the cross rail 26). A mounting pin 44 extends through openings 46 in the arms 42 and is secured to the bracket member 40 by cotter pins 48 or other like members. Alternatively, a groove could be formed in the pin 44 at each end and a snap ring secured within each groove. A plurality of rollers 50, which are preferably polyurethane rollers, are positioned over the pin 44 and spaced apart by tubular spacers 52, which are preferably made from plastic. The rollers are presented at an angle 53 of preferably within about 15°–45°, and more preferably about 30° relative to their respective cross rail 26, which has been determined to be an angle suitable for supporting the hulls of most watercraft manufactured by various companies. If desired, a plurality of pairs of openings 40a could be provided to permit the spacing of the roller assemblies 30 to be varied to tailor or custom-fit the apparatus 10 to a particular make or model of watercraft. Also, shims or other well known means could be used to lift one side of each bracket member to provide a more pronounced degree of support for each roller assembly 30.

With brief reference to FIG. 7, the intermediate roller assembly 32 is shown. Roller assembly 32 is similar in construction to roller assembly 30 with the exception of a bracket member 54 which is formed in a conventional U-shape such that arms 56 of the bracket member 54 extend generally perpendicularly from the cross rail 26. Roller assembly 32 also includes a mounting pin or axle 58 onto which a pair of rollers 60, which are also preferably polyurethane rollers identical to rollers 50, are mounted and spaced apart from one another by a tubular plastic spacer 62. The pin 58 is held to the bracket member 54 by a cotter pin 64 or other well known securing element such as the snap rings mentioned in connection with roller assembly 30. The intermediate roller assembly 32 assists in supporting the hull 12a of the watercraft 12 when the leading edge of the hull 12a is moved onto and off of the outer rail assembly 18.

Referring now to FIGS. 8 and 9, the inner rail assembly 20 is shown. The inner rail assembly 20 also includes a pair of U-shaped outer side rails 64 and a plurality of L-shaped cross rails 66 secured thereto at spaced apart locations along the outer side rails 64. The cross rails 66 are secured to the outer side rails 64 by conventional threaded fasteners and nuts (not shown) which extend through machined openings at spaced apart locations along the lengths of the outer side rails 64. Accordingly, when the cross rails 66 are secured to the outer side rails 64, the entire inner rail assembly 20 forms a rigid assembly which resists bending and flexing. Importantly, since the side rails 64 and cross rails 66 are preferably manufactured from aluminum, the entire assembly 20 is very lightweight and resistant to corrosion.

With further reference to FIGS. 8 and 9, each of the cross rails 66 includes a pair of roller assemblies 68 mounted thereon by conventional threaded bolts and nuts (not shown) extending through machined openings in each of the cross rails 66. The roller assemblies are positioned on each of the cross rails 66 to form a V-shape for supporting the hull 12a of the watercraft 12 when the hull 12a is rolled therealong. Each of the roller assemblies 68 is identical in construction to roller assembly 30 with the exception that the bracket member 69 of each assembly 68 is formed to present the rollers 70 thereof at an angle of about 5°–15° relative to each cross rail 66.

With further reference to FIGS. 8 and 11, each outer side rail 64 includes a pair of rollers 72a, 72b which are each preferably polyurethane or rubber rollers. Each of the rollers 72 is secured to its associated outer side rail 64 by a threaded bolt 65 which extends through a machined opening (not shown) in its associated side rail 64 and is secured thereto by a threaded nut 67. Accordingly, each of the rollers 72 can rotate freely relative to its associated side rail 64. The rollers 72, as well as the outer dimensions of each of the outer side rails 64, are small enough such that the entire inner rail assembly 20 may be telescopically slid into and removed from the outer side rail assembly 18. This is accomplished in large part by the rollers 72 which roll within the U-shaped outer side rails 24 (FIGS. 4 and 5) as the inner rail assembly 20 is urged telescopically into and from the outer rail assembly 18.

With further reference to FIG. 11, it will be noted that at least one of the outer side rails 24 of the outer rail assembly 18 includes a pair of stop members 74a, 74b which extend through arm portions 76a, 76b of each one of the outer side rails 24. Stop member 74a has an enlarged head portion 78 which may be grasped with the fingers of a hand of an individual and rotated to threadably disengage the member 74a from a threaded opening formed in the lower arm portion 76b of the outer side rail 24. When the members 74a are threadably disengaged from their associated side rails 24, the rollers 72 resting inside the outer side rails 24 are free to roll out of the outer side rails 24 allowing the inner rail assembly 20 to be smoothly and easily withdrawn from the outer rail assembly 18 with minimal effort. The other stop members 74b are preferably permanently secured to their associated outer side rails 24 to stop the rollers 72b from being completely withdrawn from the outer side rail 24. Thus, the inner rail assembly 20 can be withdrawn almost entirely, but not completely, from the outer rail assembly 18 as it is pulled outwardly from rail assembly 18. Conversely, when the stop members 74a are installed in their respective side rails 24, and the inner rail assembly 20 is positioned completely within the outer rail assembly 18, the inner rail assembly 20 will be prevented from being removed from the outer rail assembly 18.

With reference to FIGS. 2, 3, 9, 10 and 11, in operation an individual who is about to unload the watercraft 12 from the apparatus 10 first removes the stop members 74a. Once the stop members 74a are removed, the inner rail assembly 20 is grasped at end portion 20a (FIG. 2) and pulled outwardly of the outer rail assembly 18 until rollers 72b engage stop members 74b. Once the inner rail assembly 20 has been withdrawn from the outer rail assembly 18 it may be lowered to rest in shallow water into which the watercraft 12 is to be launched. At this point the nylon rope 34a is uncoiled from the cleat 39 and spool 38 (FIG. 11) and the individual can slowly urge the watercraft 12 off of the outer rail assembly 18 by letting out the nylon rope 34a. As the watercraft 12 moves from the outer rail assembly 18 onto the inner rail assembly 20, the individual continues to let out the nylon rope 34a to controllably lower the watercraft 12 into the water. Once in the water, the nylon rope is detached from the hull 12a of the watercraft 12. The endmost portion 20a of the inner rail assembly 20 is lifted up out of the water and slid back into the outer rail assembly 18. The stop members 74a may then be reinstalled to maintain the inner rail assembly 20 inside the outer rail assembly 18.

To load the watercraft 12, the above described operation is essentially reversed. The vehicle 16 is backed up to a point near the water from which the watercraft 12 is to be withdrawn. The stop members 74a are removed and the inner rail assembly withdrawn from the outer rail assembly 18 and lowered into the water. The nylon rope 34a is attached to the hull 12a of the watercraft 12 and the watercraft 12 is positioned such that the hull is longitudinally aligned with the inner rail assembly 20. The user then gradually draws the nylon rope 34a in and around the spool 38 to urge the watercraft 12 up the inner rail assembly 20 and onto the outer rail assembly 18. The nylon rope 34a is then wrapped around the cleat 39 to hold the watercraft 12 securely on the outer rail assembly 18 while the individual slides the inner rail assembly 20 back into the outer rail assembly 18. The stop members 74a may then be reinstalled.

From the above, it will be appreciated that the apparatus of the present invention forms a means for enabling an individual to easily load and unload a personal watercraft, as well as transport a personal watercraft, within the bed of a vehicle such as a pickup truck. While the apparatus 10 is specifically designed with dimensions enabling it to rest on a floor of a bed of a pickup truck, it will be appreciated that the apparatus 10 could just as easily be secured to a bed of a conventional trailer, which is otherwise not suited for transporting personal watercraft, provided the apparatus 10 can be securely affixed to the bed of the trailer. The apparatus 10 also can be assembled and disassembled easily with conventional tools by individuals having limited mechanical knowledge in generally 2–4 hours. Thus, if storage of the apparatus 10 during the winter months would be difficult, the apparatus 10 could be disassembled easily and quickly if needed.

With brief reference to FIG. 12, a dolly 80 is shown for permitting the watercraft 12 to be unloaded from the apparatus 10 and stored in a storage area such as a garage. The dolly 80 includes a frame 82 which is supported for rolling movement by a plurality of casters 84. The casters 84 may be locking casters which allow the dolly 80 to be held stationary during loading of the watercraft 12 thereon. A plurality of uprights 86 and bracing members 88 form the frame 82. The uprights 86 each have a plurality of selectively positioned openings 90 through which metal pins or bolts may be placed to secure a pair of L-shaped rails 92 parallel to one another. The L-shaped rails 92 are shown in FIG. 12 supporting the inner rail assembly 20. The pluralities of openings 90 enable the L-shaped rails to be adjusted to accommodate slightly higher or lower pick-up truck bed heights.

When unloading the watercraft 12 from the apparatus 10 the inner roller assembly 20 is first removed from the outer roller assembly 18 and positioned on the L-shaped rails 92. The dolly 80 is then positioned behind the bed 14 of the pickup truck 16. If needed, the height of the L-shaped rails 92 can be easily adjusted by reattaching the rails 92 at a desired one of the plurality of openings 90 in each upright 86 of the frame 82. Thus, the L-shaped rails 92 will be at about the same height as the outer rail assembly 18 when the dolly 80 is positioned behind the bed 14. A portion of the inner rail assembly 20 is then slidably inserted into the outer rail assembly 18. The watercraft 12 may then be urged off of the outer rail assembly 18 and onto the roller assemblies 68 on the inner rail assembly 20. At this point the entire watercraft 12 is supported by the dolly 80. The dolly 80 can then be wheeled away from the bed 14 to a storage area within a garage or other like structure. At this point the outer rail assembly 18 can be unsecured from the bed 14 and removed therefrom for storage. Accordingly, it will be appreciated that the dolly 80 allows a single individual to quickly, easily and conveniently unload and load a watercraft into the bed of a pickup truck. It is a principal advantage of the present invention that a single individual is able to load and unload personal watercraft from a vehicle such as a pickup truck without external tools or other mechanisms. The independent components of the apparatus 10, being preferably constructed from aluminum, are relatively light in weight and may also be lifted relatively easily by one adult onto and off of the bed of a pickup truck. The apparatus 10 thus obviates the need for an expensive trailer.

It will also be appreciated that minor modifications could also be made to the apparatus 10 to enable it to be used to load and transport other forms of recreational vehicles such as snowmobiles. For example, the roller assemblies 30, 32 and 68 could be omitted and a sheet of plywood or other panel-like material placed on each of the inner and outer roller assemblies 20 and 18 respectively. This could enable a snowmobile to be loaded and transported on the apparatus 10.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus for loading watercraft onto a pickup truck and for supporting said watercraft in a bed of said pickup truck, said apparatus comprising:

an outer rail assembly having a pair of outer side rails arranged parallel to one another and spaced apart from one another at a fixed distance such that said outer rail assembly is able to rest on a floor of said bed and be secured within said bed, said outer rail assembly further including a first plurality of spaced apart roller assemblies for engaging a hull of said watercraft and supporting said hull above said outer rail assembly; and an inner rail assembly including a pair of side rails held fixedly parallel to one another by at least one cross rail, said side rails each including a second plurality of spaced apart roller assemblies and at least one roller for riding along an associated one of said outer side rails of said outer rail assembly such that said inner rail assembly can be telescopically inserted into said outer rail assembly after said watercraft has been loaded thereon.

2. The apparatus of claim 1, further comprising:

a locking member associated with one of said outer and inner rail assemblies for preventing said inner rail assembly from moving slidably outwardly of said outer rail assembly once said watercraft has been loaded onto said outer rail assembly and said inner rail assembly has been slidably inserted into said outer rail assembly.

3. The apparatus of claim 1, further comprising:

a pulley assembly associated with one of said outer and inner rail assemblies for assisting in loading and unloading said watercraft from said outer and inner rail assemblies.

4. The apparatus of claim 1, wherein said outer rail assembly includes a plurality of cross rails spaced apart from one another; and wherein each said cross rail of said outer rail assembly includes a pair of said first plurality of rollers disposed thereon in a V-shaped arrangement for supporting said hull of said watercraft thereon.

5. The apparatus of claim 1, wherein said inner rail assembly includes a plurality of cross rails spaced apart from one another; and wherein each said cross rail includes a pair of said second plurality of roller assemblies mounted thereon in a V-shape for supporting said hull of said watercraft and permitting said watercraft to be rolled along substantially the entire length of said inner rail assembly.

6. The apparatus of claim 4, wherein each of said first plurality of roller assemblies is mounted on a bracket member, said bracket members being arranged along said cross rails to form a V-shaped orientation.

7. The apparatus of claim 5, further comprising a plurality of bracket members secured to said cross rails of said inner rail assembly for supporting said rollers in a V-shaped orientation on said inner rail assembly.

8. The apparatus of claim 1, further comprising an upright member secured at one end of said outer rail assembly to stop movement of said watercraft during loading on said outer rail assembly.

9. An apparatus for loading and unloading a watercraft from a bed of a pickup truck and for transporting said watercraft thereon within said bed of said pickup truck, said apparatus comprising:

an outer rail assembly having a first pair of outer side rails and a plurality of first cross rails fixedly secured to said first pair of outer side rails to position said first pair of outer side rails generally parallel to one another at a width permitting said outer rail assembly to rest on a floor of said bed of said pickup between a pair of wheel wells of said bed, each one of said first cross rails including a pair of first roller assemblies configured in a V-shape and longitudinally aligned with one another to support a hull of said watercraft when said watercraft is loaded onto said outer rail assembly;

an inner rail assembly including a second pair of outer side rails and a plurality of second cross rails for disposing said second pair of outer side rails generally parallel to one another at a distance from one another permitting said second pair of outer side rails to be telescopically slid into said first pair of outer side rails, each one of said second cross rails including a pair of second roller assemblies disposed in a V-shaped arrangement for supporting said hull when said watercraft is moved along said plurality of second roller assemblies;

at least one pair of guide rollers, one of each pair of said guide rollers being disposed along an associated one of said second pair of outer side rails and each one of said guide rollers being of dimensions permitting it to roll freely along an associated one of said first pair of outer side rails such that said inner rail assembly can be telescopically rolled into said outer rail assembly;

a manually releasable stop member for maintaining said inner rail assembly within said outer rail assembly;

an upright stop member associated with said outer rail assembly for limiting movement of said watercraft when said watercraft is loaded onto said outer rail assembly; and a pulley assembly associated with said outer rail assembly for manually urging said watercraft along said inner and outer rail assemblies when loading and unloading said watercraft from said apparatus.

10. The apparatus of claim 9, further comprising a pair of strap members secured to said outer rail assembly for holding said outer rail assembly securely within said bed of said pickup.

11. The apparatus of claim 9, wherein said first pair of outer side rails each comprise a U-shaped member forming an elongated channel; and wherein each one of said second pair of outer side rails each comprise a U-shaped member being of outer dimensions smaller than said first pair of outer side rails.

12. The apparatus of claim 11, wherein said guide rollers each have a dimension smaller than said channel formed by each one of said U-shaped members to enable said guide rollers to roll freely within each one of said U-shaped members.

13. The apparatus of claim 9, wherein each one of said first pair of outer side rails, said first plurality of cross rails, said second pair of outer side rails and said second plurality of cross rails are each constructed from aluminum.

14. The apparatus of claim 12, wherein said outer rail assembly includes a stop member associated with said outer rail assembly to prevent said inner roller assembly from being completely withdrawn and detached from said outer rail assembly when said inner rail assembly is telescopically urged outwardly of said outer rail assembly.

15. The apparatus of claim 9, wherein each one of said first plurality of cross rails comprises a U-shaped member and each one of said second plurality of cross rails comprises an L-shaped member; and wherein each one of said first and second roller assemblies comprises a generally U-shaped bracket secured to an associated one of said cross rails, a mounting pin extending through portions of said U-shaped bracket to extend generally non-parallel to said associated cross rail, a plurality of rollers disposed for rotational movement about said mounting pin and a plurality of spacers for maintaining said rollers spaced apart from one another along said mounting pin.

16. The apparatus of claim 15, wherein each one of said rollers comprises a polyurethane roller.

17. An apparatus for loading and unloading a personal watercraft from a bed of a vehicle such as a pickup truck and for transporting said watercraft thereon, said apparatus comprising:

an outer rail assembly having a first pair of outer side rails each forming a U-shaped channel, a first plurality of spaced apart cross rails fixedly disposed to said first pair of outer side rails, and a pair of roller assemblies disposed on each one of said first cross rails for supporting a hull of said watercraft thereon and enabling said watercraft to be rolled onto said outer rail assembly, and a member fixedly secured to said outer rail assembly for limiting rolling movement of said watercraft at a predetermined point when said watercraft is loaded onto said outer rail assembly;

an inner rail assembly comprising a second pair of U-shaped outer side rails, a plurality of second cross rails fixedly secured to said second pair of outer side rails so as to space said second pair of outer side rails a distance apart from one another to permit said inner rail assembly to be telescopically slid within said outer rail assembly, and a pair of roller assemblies secured to each one of said second plurality of cross rails for supporting said hull of said watercraft when said watercraft is urged slidably up and down said inner rail assembly, a plurality of pairs of guide rollers, at least one pair of said guide rollers disposed on each one of said second outer side rails and being of dimensions permitting said guide rollers to roll within said U-shaped channel formed by each one of said first pair of outer side rails when said inner rail assembly is slidably urged inwardly and outwardly of said outer rail assembly;

said outer rail assembly including a first stop member associated with one of said first pair of outer side rails for limiting the degree to which said inner rail assembly can be telescopically removed from said outer rail assembly for preventing said inner rail assembly from being completely withdrawn from said outer rail assembly; said outer rail assembly including a second, manually removable stop member which, when secured to said outer rail assembly while said inner rail assembly is disposed within said outer rail assembly, prevents said inner rail assembly from being withdrawn from said outer rail assembly, and when removed permits said inner rail assembly to be telescopically withdrawn from said outer rail assembly;

a pulley assembly associated with said outer rail assembly for urging said watercraft on and off of said inner and outer rail assemblies; and a plurality of members for securing said outer rail assembly within said bed of said pickup truck.

18. The apparatus of claim 17, wherein said roller assemblies are arranged on said first and second cross rails to form a plurality of longitudinally V-shaped roller assemblies.

19. The apparatus of claim 17, further comprising an independent dolly engageable with said inner rail assembly for supporting said inner rail assembly for enabling said watercraft to be unloaded off of said outer rail assembly and wheeled to a storage area.

20. The apparatus of claim 17, wherein each said roller assembly comprises:

a mounting pin;

a plurality of rollers disposed on said mounting pin for rotational movement; and a plurality of spacers disposed on said mounting pin for maintaining said rollers spaced apart from one another.

* * * * *